April 7, 1953  F. W. BROWNING  2,633,751
V BELT SHEAVE
Filed Aug. 9, 1949
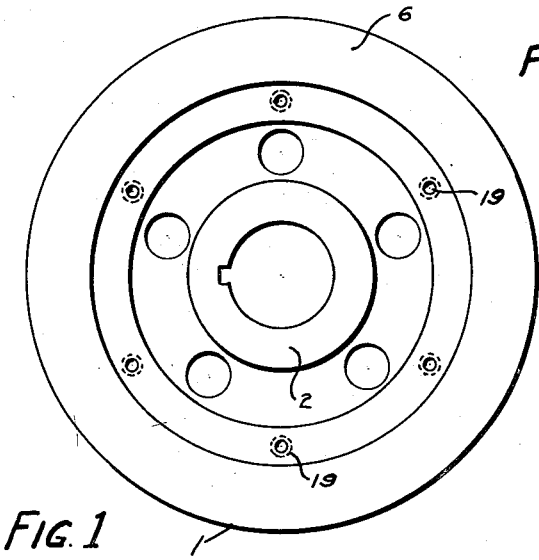
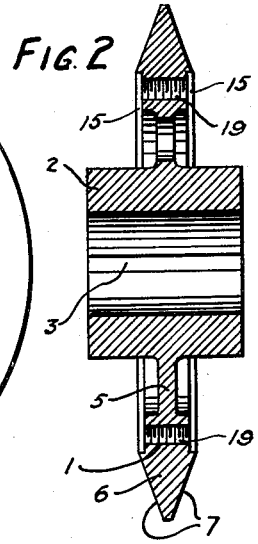
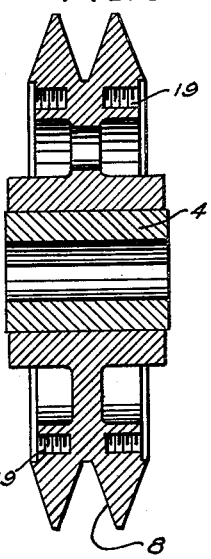
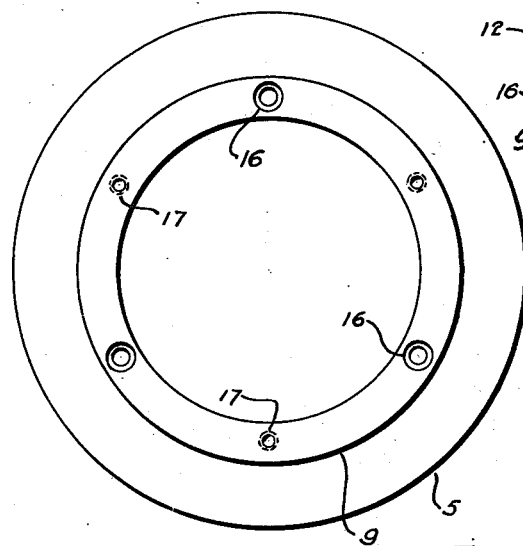
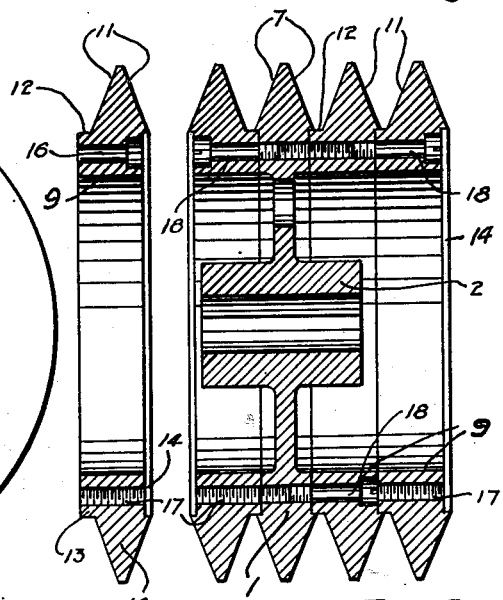
INVENTOR.
Fletcher W. Browning
BY
Cyrus Kehr & Swecker
ATTORNEY Patented Apr. 7, 1953

2,633,751

UNITED STATES PATENT OFFICE 2,633,751

V-BELT SHEAVE

Fletcher W. Browning, Knoxville, Tenn.

Application August 9, 1949, Serial No. 109,359

15 Claims. (Cl. 74—230.01)

This application is a continuation-in-part of my prior application, Ser. No. 725,199, filed January 30, 1947, now Patent No. 2,500,515.

This invention relates to improvements in V-belt sheaves of the character used, particularly in multiple V-belt drives.

It has been the practice heretofore to use multiple V-belts in driving units, in which a plurality of belts extends over a single sheave in V-grooves therein for driving a shaft. This has required a complete sheave having the desired number of V-grooves for each size and number of belts to be used. For different types of machinery, many different sizes and forms of sheaves are necessary, which is especially objectionable to a dealer because of the large stock of parts that he is required to handle.

An object of this invention is to improve the construction of a V-belt drive by providing for the ready assembly of any desired number of V-belt rings on a single common spider adapted to be mounted on a shaft which will permit of variation of the number of belts to be used and the assembly of the parts desired for the drive very readily and quickly at relatively low cost. This would make it unnecessary for a dealer to handle many different sizes of sheaves because these can be assembled to the required specifications very readily and at low cost while yet insuring of accurate operation.

In the construction set forth in my prior application referred to above, the pulley spider and rings were formed respectively with V-grooves in the peripheries thereof adapted to receive the respective V-belts. In making such elements it was necessary to remove the metal from the body portions to form the V-grooves, because these could not be cast or otherwise machined without a considerable loss of metal and consumption of time in manufacturing the respective elements. Furthermore, the formation of V-grooves adapted these to receive only one size of belt in each instance, and an accurate operation of the pulley would provide for a drive connection only with belts of particular sizes.

A further object of this invention is to overcome these objections to my prior construction and to improve the character of the sheave or pulley, both as to its manufacturing properties and its adaptability for use with belts of different sizes.

Accordingly, in carrying out these objects I prefer to form the respective elements of the pulley or sheave with laterally tapered peripheral flanges on each element thereof, as distinguished from V-grooves in the prior construction, so as to co-act with another companion element in forming a V-groove adapted to receive a belt, while the construction otherwise has the advantages heretofore set forth. The formation of the driving portion of each element by diverging opposite sides effects a substantial saving in material and cost of manufacture, and also adapts the respective elements to use with belts of different sizes when connected in assembled relation.

Certain embodiments of the invention are illustrated in the accompanying drawings, in which:

Fig. 1 is a side elevation of a V-belt sheave embodying this invention;

Fig. 2 is a cross section through a spider therefor;

Fig. 3 is a similar view through a spider of modified construction;

Fig. 4 is a side elevation of one of the rings detached;

Fig. 5 is a cross section therethrough; and

Fig. 6 is a cross section through a completed assembled V-belt driving sheave.

The invention is shown as including a spider, generally designated by the numeral 1, which forms the basic element of the sheave, with means for connection with a shaft or other driving or driven means. The spider 1 includes a hub 2 for attachment to the shaft. Any suitable means of attachment may be provided as desired, such as a key seat 3 in the form shown in Fig. 2, or a separate bushing 4 according to the form shown in Fig. 3.

Extending outwardly from the hub 2 is a radial portion 5 formed by spokes or a web for joining the hub to a peripheral driving portion, generally designated at 6. This portion 6 is adapted for connection with a V-belt either at one side 7 thereof, as shown in Fig. 2, or by means of a V-groove 8 therein, according to the form shown in Fig. 3. A single V-groove in the periphery of the spider will locate one driving belt symmetrically on the transverse axis of the spider with respect to the center of the mounting on the shaft, although if a pair of belts are to be used these may have driving connection with opposite faces 7 on the center portion 6 of the spider, according to the form shown in Fig. 2. The faces 7 flare in opposite directions and are adapted to co-act with corresponding faces on an adjacent element and thereby form one side of a V-groove in the assembled sheave.

Co-acting with the spider 1 are driving rings, generally designated at 9, any suitable number of which may be used, as desired, and preferably are located on different sides of the spider, as illustrated generally in Fig. 6. Each of the driving rings 9 is formed as an annulus, as shown in Fig. 4, with a driving connection 10 at the periphery thereof provided with diverging opposite sides 11 with a V-shaped portion therebetween. One of the faces 11 of the innermost ring is adapted to be mounted in opposite relation to the adjacent face 7 on the spider 1 so as to form a V-groove therebetween, while the opposite face may co-act with a corresponding face of an adjacent outer ring to form a V-groove therebetween, as shown in Fig. 6. At one side of the body portion 10 at the inner edge of the side face 11 is formed a cylindrical face 12 on the driving ring, which, when assembled with the spider or with an adjacent ring, forms the inner edge portion of the V-groove, as will be apparent from the drawings. This cylindrical portion 12 is formed on a lateral projection 13 on the driving ring 9 in position to interfit with a cylindrical recess 14 formed in an adjacent side of a co-acting ring, or with a cylindrical recess 15 formed in either side of the spider 1. The projection 13 and recess 14 or 15 extend continuously throughout the circumference of the respective elements for accurate alignment of the parts of the sheave in inter-engagement when the parts are assembled to form a tight connection therebetween.

Each of the driving rings 9 has a plurality of openings therethrough, as indicated respectively at 16 and 17, which openings alternate with each other, as shown in Fig. 4. The openings 16 are bolt holes having countersunk portions at the outer faces of the ring and are adapted to receive therein headed screws 18, with the heads thereof received entirely within the countersunk portions of the holes. The openings 17 are internally threaded to receive the threaded ends of corresponding cap screws for securing the next adjacent driving ring thereto, the latter openings extending to the outer face of the driving ring. The cap screws 18 enter internally-threaded openings 19 in each corresponding side of the spider 1.

By means of these alternate countersunk and tapped holes 16 and 17, the screw fastenings are staggered with respect to each other and stepped around the periphery of the sheave. This insures that all of the rings and the spider will be tied together in secure relationship and in accurate alignment for uniform driving of the parts.

By forming the driving portions of both the spider and the rings, or either of these, of V-shape in cross section with diverging opposite faces, an appreciable saving is effected of the material used in forming these elements, as well as of labor in finishing the faces thereof. Furthermore, a ring of this design may be manufactured either by turning, die-casting, or drop-forging, is much faster to produce and just as effective in use as a single unitary sheave. Separate rings made according to this invention will accommodate belts of different sizes without change in the size of the spider used in connection therewith.

By using these spiders and separate rings, they may be interconnected in any desired width of sheave and number of grooves, as desired. This will make it possible to add grooves to sheaves in use and to permit a dealer to assemble a large variety of sheaves from standard parts without the necessity for carrying in stock the respective different sizes thereof. This is a material saving to the dealer and manufacturer and will result in an appreciable saving to the user.

While the invention has been illustrated and described in certain embodiments, it is recognized that variations and changes may be made therein without departing from the invention, except as specified in the claims.

I claim:

1. A V-belt sheave comprising a spider having a portion constructed for mounting on a shaft and having an annular peripheral V-belt driving portion thereon, a separate ring mounted on one side of the peripheral portion of the spider, means for detachably securing the ring to the annular peripheral V-belt driving portion of said spider, said ring having a peripheral V-belt driving portion thereon with laterally flaring opposite sides of which one co-acts with the driving portion of the spider to form a V-groove therebetween, and means forming an interfitting connection between the ring and spider and extending continuously throughout substantially the entire circumference thereof to hold the ring and spider in aligned relation with each other.

2. A V-belt sheave comprising a spider having a portion constructed for mounting on a shaft and having an annular peripheral V-belt driving portion thereon with laterally diverging opposite faces extending inwardly from the periphery of said portion, a plurality of driving rings connected with the spider, each of the rings having a peripheral V-belt driving portion with laterally diverging opposite faces extending inwardly from the periphery thereof, one of said rings being in abutting relation with a side face of the spider and co-acting with the driving portion thereof to form a V-groove therebetween, and detachable fastenings connecting the rings together and to the spider, each of the rings having a lateral projection on one side thereof with a cylindrical face in position to form an inner edge portion on a V-groove between said ring and an adjacent ring on the spider.

3. An article of manufacture for use with a V-belt sheave spider, comprising a sheave ring adapted to be secured in side-by-side relation with the spider, said ring having a peripheral driving portion thereon with laterally diverging opposite faces extending inwardly from the periphery of said portion adapted to co-act with an adjacent ring and the spider to form V-grooves for receiving belts therein, said ring having a lateral projection on one side thereof and having a recess on the opposite side thereof adapted for interfitting connection with an adjacent ring and spider, respectively, the projection having a peripheral cylindrical portion of appreciably greater transverse width than the depth of the recess to fit in a corresponding recess and to project therefrom to form an inner face in the V-groove.

4. A V-belt sheave comprising a spider having a hub portion constructed for mounting on a shaft and having an annular peripheral portion symmetrically arranged relative to said hub portion and with a peripheral driving portion thereon with lateral diverging opposite faces extending inwardly from the periphery of said portion, a plurality of rings mounted on opposite sides of the peripheral portion of the spider coaxially thereof with one of said rings in abutting relation against each opposite side of the spider, each of said rings having a peripheral V-belt driving portion with laterally diverging opposite faces extending inwardly from the periphery thereof, said spider having a laterally countersunk face extending continuously throughout the circumference thereof, each of the rings having a lateral projection at one face corresponding in size and shape with the countersunk face of the spider and having the opposite face thereof countersunk for interfitting relation with adjacent rings, said spider having tapped holes in opposite sides thereof, each of the rings having countersunk bolt holes therein and tapped holes intermediate the bolt holes, headed screw fastenings extending through the bolt holes into threaded engagement with the spider at each opposite side thereof, and screw fastenings extending through each of the rings spaced from the spider and into threaded engagement with the next adjacent ring in the tapped holes thereof for securing the rings directly together.

5. A V-belt sheave comprising a spider having a hub portion constructed for mounting on a shaft and having an annular peripheral portion symmetrically arranged relative to said hub portion and with a peripheral driving portion thereon with laterally diverging opposite faces extending inwardly from the periphery of said portion, a plurality of rings mounted on opposite sides of the peripheral portion of the spider coaxially thereof with one of said rings in abutting relation against each opposite side of the spider, each of said rings having a peripheral V-belt driving portion with laterally diverging opposite faces extending inwardly from the periphery thereof, said spider having tapped holes in opposite sides thereof, each of the rings having countersunk bolt holes therein and tapped holes intermediate the bolt holes, headed screw fastenings extending through the bolt holes into threaded engagement with the spider at each opposite side thereof, and screw fastenings extending through each of the rings spaced from the spider and into threaded engagement with the next adjacent ring in the tapped holes thereof for securing the rings directly together.

6. A V-belt sheave comprising a spider having a portion constructed for mounting on a shaft and having an annular peripheral V-belt driving portion thereon, said ring having a lateral side of the peripheral portion of the spider coaxially thereof in abutting relation against a side of the spider, said ring having a V-belt driving portion thereon, a ring mounted on one projection on one side thereof with a cylindrical face in position to form an inner edge portion of a V-groove between said ring and an adjacent ring on the spider, said spider having tapped holes in a side thereof, the ring having countersunk bolt holes therein and tapped holes intermediate the bolt holes, headed screw fastenings extending through the bolt holes into threaded engagement with the spider with the heads flush with the outer surface of the ring whereby a second ring may be mounted on the first ring in abutting relation, and the tapped holes in said first ring being arranged at said outer surface for receiving screw fastenings to hold said second ring in place thereon.

7. A V-belt sheave comprising a hub, a spider mounted on said hub, an annular ring mounted on said spider and spaced from said hub, an annular peripheral V-belt driving portion formed on said ring, a separate ring mounted on one side of the peripheral portion of the annular ring, said separate ring having a lateral projection on one side thereof with a cylindrical face in position to form an inner edge portion of a V-groove between said annular ring and said separate ring, means for detachably securing the separate ring to the annular ring, said separate ring having a peripheral V-belt driving portion thereon with laterally flaring opposite sides, one of which last-named sides co-acts with a side on the driving portion of said annular ring to form a V-groove therebetween, and means forming an interfitting connection between the rings and extending continuously throughout substantially the entire circumference thereof to hold the rings in aligned face-to-face relation with each other.

8. A V-belt sheave comprising a hub, a radial portion on said hub, an annular peripheral V-belt driving portion on said radial portion, said radial portion and driving portion being disposed in coplanar relation, a separate ring detachably carried on one side of the driving portion, means for detachably securing the separate ring to the driving portion, said separate ring having laterally flaring opposite sides adjacent its periphery, one of which last-named sides coacts with a side on the driving portion to form a V-groove therebetween, and means forming an interfitting connection between the ring and the driving portion and extending continuously throughout substantially the entire circumference thereof to hold the ring in aligned face-to-face relation with the driving portion.

9. An article of manufacture comprising a spider for a V-belt sheave, said spider having a hub and an annular peripheral driving portion provided with laterally diverging opposite faces, said spider having a coaxial cylindrical recess formed in each side thereof to receive slidably therein a portion of a coacting sheave ring, and said spider having a plurality of circumferentially spaced tapped openings extending transversely therethrough adjacent said peripheral driving portion to receive threaded fastenings therein which extend through said rings whereby said sheave rings may be secured to said spider, optionally, on either or both sides thereof.

10. A V-belt sheave comprising a spider having a hub and an annular peripheral driving portion, said driving portion including an inner pair of converging laterally opposed faces forming a belt receiving groove therebetween, and a pair of outer laterally diverging faces, a ring mounted on one side of the peripheral portions of said spider coaxially thereof and in abutting relation against said side of said spider, said ring having a peripheral belt driving portion thereon with laterally diverging opposite faces, one of said last-named faces being in opposed relation to one of said outer peripheral faces of said spider to form a second belt receiving groove therebetween, and means detachably securing said ring to said spider.

11. A V-belt sheave comprising a spider having a hub and an annular peripheral driving portion, said driving portion including an inner pair of converging laterally opposed faces forming a belt receiving groove therebetween, and a pair of outer laterally diverging faces, a plurality of rings mounted on each side of said spider coaxially thereof and in abutting relationship with respect to said spider and to each other, separate means connecting each ring with an adjacent ring, independent means for connecting one of said rings with said spider at each side thereof, respectively, each of said rings having a peripheral belt driving portion thereon with laterally diverging opposed faces and forming a belt groove between each adjacent pair of rings, and said rings secured to said spider having a driving portion in opposed relation to an adjacent face of said driving portion of said spider.

12. A V-belt sheave comprising a spider having a hub and an annular peripheral driving portion comprising a pair of laterally diverging faces, a plurality of rings mounted on opposite sides of the peripheral portion of said spider co-axially thereof with one of said rings in abutting relation against each opposite side of the spider, each of said rings having a peripheral belt driving portion with laterally diverging opposed faces extending inwardly from the peripheries thereof, said spider having a laterally countersunk face extending continuously throughout the circumference thereof, each of said rings having a lateral projection at one face corresponding in size and shape with the countersunk face of the spider and having the opposite face thereof countersunk for fitting relation with adjacent rings, said spider having tapped holes extending therethrough, each of said rings having countersunk bolt holes therein and tapped holes intermediate the bolt holes, headed screw fastenings extending through the bolt holes and into threaded engagement with the tapped holes in said spider at each opposite side thereof, and screw fastenings extending through each of the rings spaced from said spider and into threaded engagement with the next adjacent ring in the tapped holes thereof for securing the rings directly together.

13. A V-belt sheave comprising a spider having a hub and an annular peripheral driving portion, said driving portion comprising a pair of outer laterally diverging faces, a plurality of rings mounted on opposite sides of the peripheral portion of said spider co-axially thereof with one of said rings in abutting relation against each opposite side of said spider, each of said rings having a peripheral V-belt driving portion with laterally diverging opposed faces extending inwardly from the peripheries thereof, said spider having tapped holes extending transversely therethrough, each of said rings having countersunk bolt holes therein and tapped holes intermediate the bolt holes, headed screw fastenings extending through the bolt holes and into threaded engagement with the tapped holes in said spider at each opposite side thereof, and screw fastenings extending through each of the rings spaced from the spider and into threaded engagement with the next adjacent ring in the tapped holes thereof for securing said rings directly together.

14. A V-belt sheave comprising a spider having a hub and an annular peripheral driving portion comprising a pair of outer laterally diverging faces, a ring mounted on one side of the peripheral portion of said spider co-axially thereof in abutting relation against a side of said spider, said ring having a V-belt driving portion thereon, said ring having a lateral projection on one side thereof with a cylindrical face in position to form an inner edge portion of a belt receiving groove between said ring and an adjacent ring on said spider, said spider having tapped holes extending transversely therethrough, said ring having countersunk bolt holes therein and tapped holes intermediate the said bolt holes, said screw fastenings extending through said bolt holes into threaded engagement with said tapped holes formed in said spider with the heads flush with the outer surface of said ring whereby a second ring may be mounted on said face in abutting relation, and tapped holes in said first ring being arranged at said outer surface for receiving screw fastenings to hold said second ring in place thereon.

15. A V-belt sheave comprising a spider having a hub and an annular peripheral driving portion comprising a pair of outer laterally diverging faces, an annular ring mounted on said spider and spaced from said hub, an annular peripheral belt driving portion formed on said ring, a separate ring mounted on one side of the peripheral portion of said annular ring, said separate ring having a lateral projection on one side thereof with a cylindrical face in position to form an inner edge portion of a belt receiving groove between said annular ring and said separate ring, means for detachably securing said separate ring to said annular ring, said separate ring having a peripheral belt driving portion thereon with laterally flaring opposite sides, one of said last-named sides co-acting with a side on the driving portion of said annular ring to form a belt receiving groove therebetween, and means forming an interfitting connection between said rings and extending continuously through the entire circumference thereof to hold said rings in aligned face to face relation with each other.

FLETCHER W. BROWNING.

REFERENCES CITED

The following references are of record in the file of this patent:

UNITED STATES PATENTS

| Number | Name | Date |
|---|---|---|
| 364,498 | Dougherty | June 7, 1887 |
| 464,795 | Dodge | Dec. 8, 1891 |
| 1,740,087 | Hall | Dec. 17, 1929 |
| 1,792,733 | De Wein | Feb. 17, 1931 |
| 2,427,172 | Williams | Sept. 9, 1947 |